United States Patent
Chen

(10) Patent No.: US 9,377,127 B2
(45) Date of Patent: Jun. 28, 2016

(54) BALL VALVE WITH SQUARE BORE AND QUARTER TURN COMPONENT

(71) Applicant: Keyva Control, Inc., Flushing, NY (US)

(72) Inventor: Shuguang Chen, Shanghai (CN)

(73) Assignee: Keyva Control, Inc., Flushing, NY (US)

( * ) Notice: Subject to any disclaimer, the term of this patent is extended or adjusted under 35 U.S.C. 154(b) by 0 days.

(21) Appl. No.: 14/182,856

(22) Filed: Feb. 18, 2014

(65) Prior Publication Data

US 2015/0233477 A1 Aug. 20, 2015

(51) Int. Cl.
- *F16K 47/02* (2006.01)
- *F16K 47/04* (2006.01)
- *F16K 5/06* (2006.01)

(52) U.S. Cl.
CPC .............. *F16K 47/045* (2013.01); *F16K 5/0605* (2013.01)

(58) Field of Classification Search
USPC .................................................... 137/625.32
See application file for complete search history.

(56) References Cited

U.S. PATENT DOCUMENTS

| | | | |
|---|---|---|---|
| 3,880,191 A * | 4/1975 | Baumann | 137/625.32 |
| 4,540,025 A * | 9/1985 | Ledeen et al. | 137/625.32 |
| 4,665,946 A * | 5/1987 | Hulsey | 137/625.3 |
| 5,218,984 A * | 6/1993 | Allen | 137/1 |
| 5,509,446 A * | 4/1996 | Bey | 137/625.32 |
| 5,680,889 A * | 10/1997 | Boger | 137/625.32 |
| 5,758,689 A * | 6/1998 | Leinen | 137/625.32 |
| 5,771,929 A * | 6/1998 | Boger | 137/625.32 |
| 5,937,901 A * | 8/1999 | Bey | 137/625.32 |
| 6,868,865 B2 * | 3/2005 | Tran | 137/625.32 |
| 6,923,210 B2 * | 8/2005 | Tran | 137/625.3 |
| 6,974,116 B1 * | 12/2005 | Christenson et al. | 251/127 |
| 7,044,436 B2 * | 5/2006 | Corbetta et al. | 251/127 |
| 7,156,122 B2 * | 1/2007 | Christenson et al. | 137/625.32 |
| 7,278,448 B2 * | 10/2007 | Christenson et al. | 137/625.32 |

\* cited by examiner

*Primary Examiner* — John Fox
(74) *Attorney, Agent, or Firm* — Lai, Corsini & Lapus, LLC

(57) ABSTRACT

The invention relates to a turned regulating ball valve, which comprises a ball valve body, a ball and a stem mechanically fixed with the ball, the ball can be rotated by 90 degrees in the ball valve body using the stem as an axis, a first side and a second side of the ball valve body are respectively provided with an inlet seat and an outlet seat, the ball valve body and the inlet seat are provided with an inlet fluid passage, the ball valve body and the outlet seat are provided with an outlet fluid passage, the ball is placed between the inlet seat and the outlet seat, a first part of the ball, which is close to the inlet seat, is provided with a control assembly, and a second side of the ball, which is close to the outlet seat, is provided with a plurality of hole fluid channels which communicate with the control assembly. The turned regulating ball valve has the advantages that are: enlarging a fluid flow area at an entrance of the ball; enabling accurate regulations; allowing regulations under a high pressure differential.

2 Claims, 10 Drawing Sheets

Figure 1:
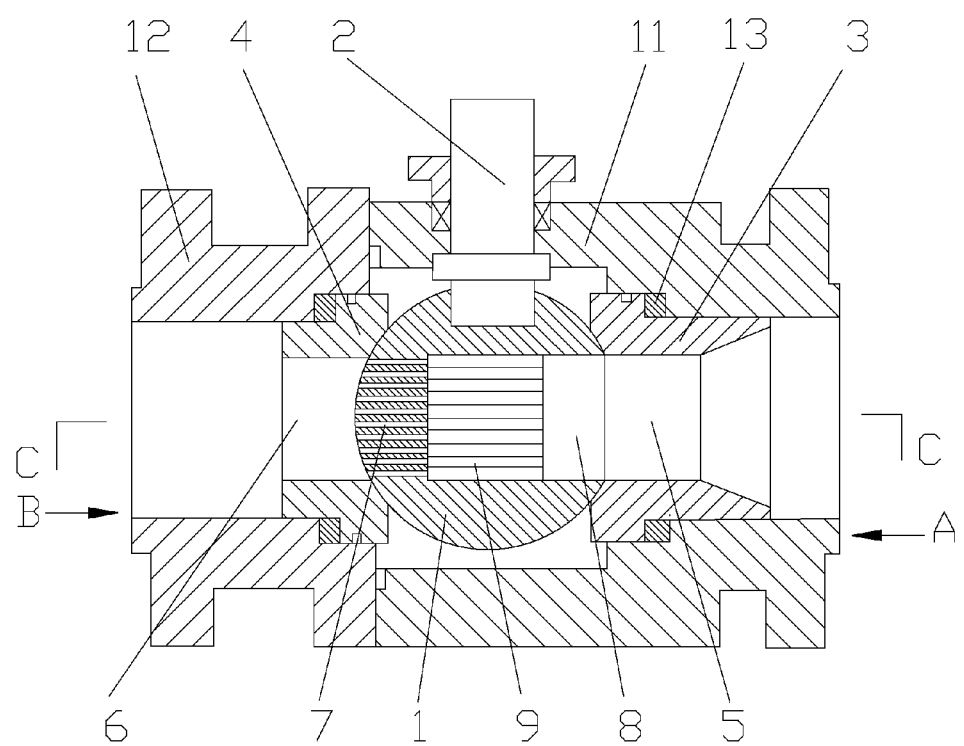
Figure 2:
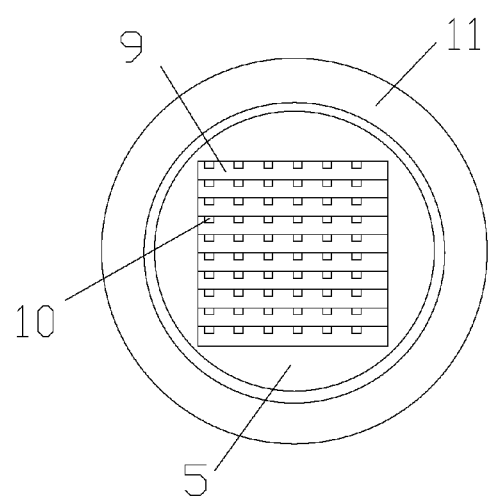
Figure 3:
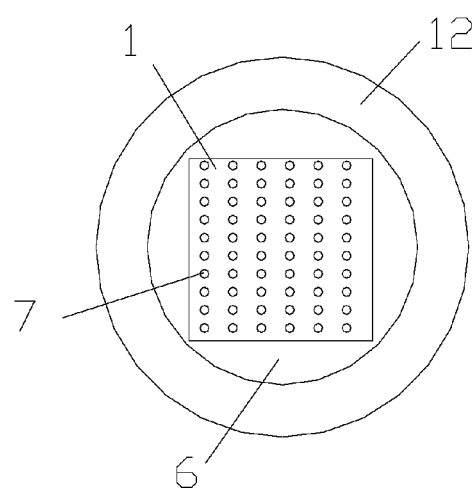
Figure 4:
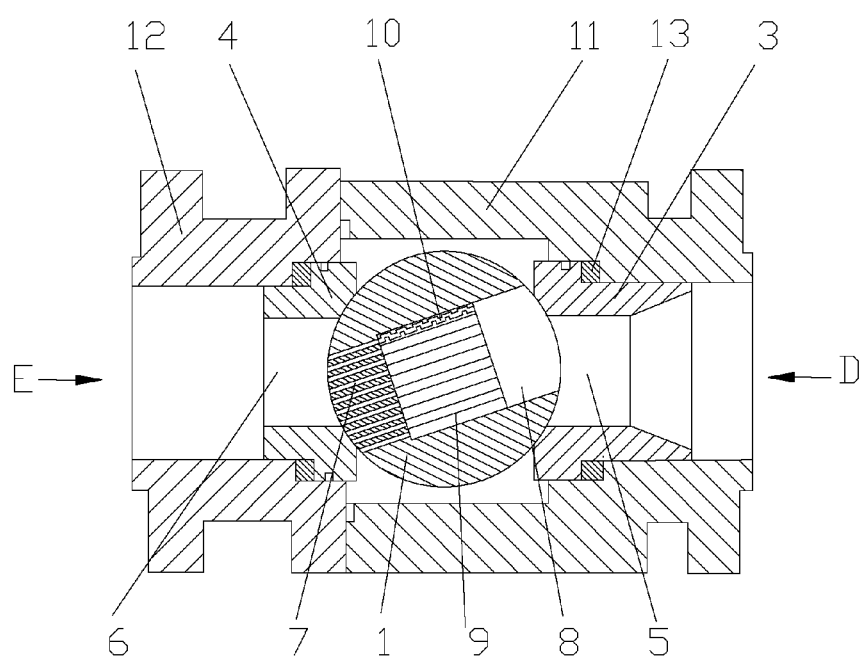
Figure 5:
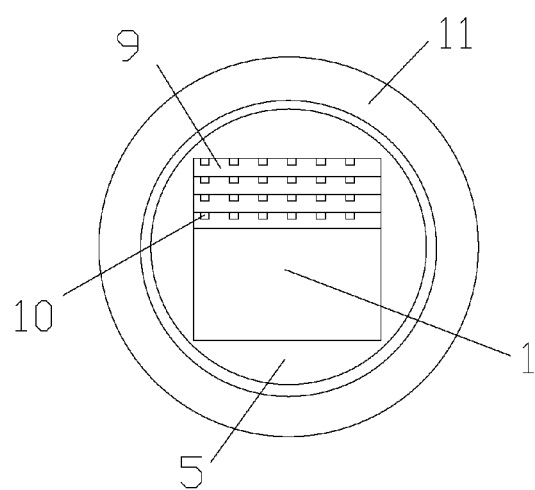
Figure 6:
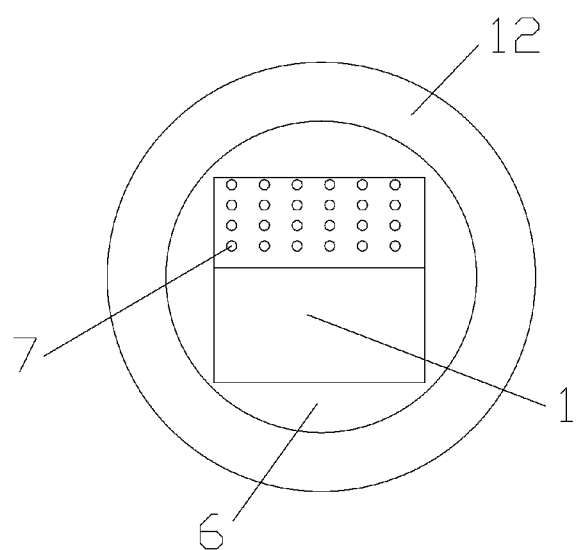
Figure 7:
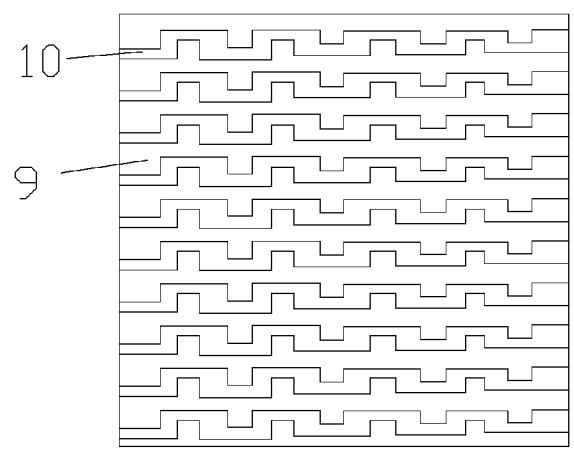
Figure 8:
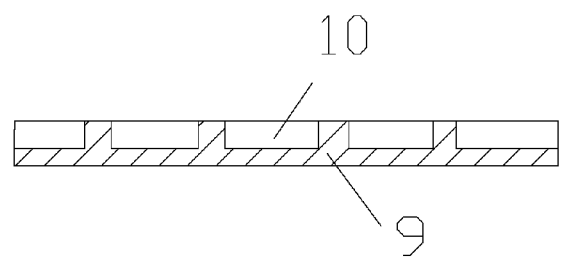

BALL VALVE WITH SQUARE BORE AND QUARTER TURN COMPONENT

CROSS-REFERENCES TO RELATED APPLICATIONS

Not applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A SEQUENCE LISTING

Not Applicable.

BACKGROUND OF THE INVENTION

One kind of turned ball valve technology.

The present invention relates to a turned ball valve.

Existing regulating valves typically include a body, a stem, a ball and a seat. The seat has a round hole fluid channel, whereas the ball contains a V-bore control port. The ball and the stem are mechanical fixed together wherein the ball and the seat functions as sealing elements. The ball and seat forms a ball surface match,. The ball could rotate within the body up to 90 degrees using the stem as an axis. During the rotating process, the V-bore control port on the ball and the seat configure into a opening with different opening degrees, whereas a flowing volume may be adjusted.

Shortcomings of the existing valves include: in the adjusting process, the opening configured by the ball and the seat may form irregular shapes, thus the adjusting process does not impose an accurate character; under working condition with a high pressure differential, a ball port on the ball and a seat port on the seat are frequently eroded by fluid mediums which have high flowing rates under the high pressure differentials, leading to larger sputtering surfaces and sputtering volumes. The existing regulating valves are not appreciated for regulations under the high pressure differential.

BRIEF SUMMARY OF THE INVENTION

The object of the present invention is to provide a turned regulating ball valve, said turned regulating ball valve may overcome existing valves' shortcomings including inaccurate characters due to irregular-shaped openings during adjusting processes, and frequent erosions to ball ports and seat ports under high pressure differentials.

In one embodiment, the present invention achieve the following technical solutions: a turned regulating ball valve, which includes a ball valve body, a ball and a stem fixed to the ball. The ball may rotate within the ball valve body up to 90 degrees using the stem as an axis. A first side and a second side of the ball valve body each is provided with an inlet seat and an outlet seat respectively; an inlet fluid passage is provided to said ball valve body and the inlet seat; an outlet fluid passage is provided to said ball valve body and the outlet seat. The ball is located between the inlet seat and the outlet seat. A control assembly is provided to a first part of the ball close to the inlet seat; a plurality of hole fluid channels is provided to a second part of the ball close to the outlet seat and connected to the control assembly.

In a yet preferred embodiment, said control assembly on the ball is provided with a ball fluid bore. Said control assembly includes a plurality of layers of component discs, said component discs are provided with a plurality of multi-level angle turn flow channels, said multi-level angle turn flow channels are connected to the hole fluid channels.

In an even preferred embodiment, the control assembly, the ball fluid bore, the inlet fluid passage, the outlet fluid passage and hole fluid channels and their combinations all have square-shaped cross-sections.

In yet another embodiment, the ball valve body includes a main body and an auxiliary body, sealing elements are provided to connecting sections in between the main ball valve body, the auxiliary body, the inlet seat, the outlet seat and/or the stem.

The present invention has the advantages including:

1. during the adjusting process, the ball and the inlet seat form the ball fluid bore with the square-shaped cross-sections, which increases the flowing volume of fluid mediums at an entrance port of the ball;
2. during the adjusting process, the fluid medium's flow rate may be precisely regulated by adjusting rotating degrees of the ball, which leads to an accurate adjustment.
3. the fluid medium passes through the plurality of the multi-level angled turn fluid channel on the layers of component discs, wherein said fluid medium is diverted and depressurized at each turn of said multi-level angled turn fluid channel, which is appreciated for regulating requirements under high pressure differentials.

BRIEF DESCRIPTION OF THE DRAWINGS

The invention is further described in detail in following drawings:

FIG. 1 is a cross-sectional view of an embodiment of the present invention.

FIG. 2 is a cross-sectional view of Direction A in FIG. 1.

FIG. 3 is a cross-sectional view of Direction B in FIG. 1.

FIG. 4 is a cross-sectional view of Direction C-C in part of FIG. 1.

FIG. 5 is a cross-sectional view of Direction D in FIG. 4.

FIG. 6 is a cross-sectional view of Direction E in FIG. 4.

FIG. 7 is a top cross-sectional view of a component disc in an embodiment of the present invention.

FIG. 8 is another cross-sectional view of a component disc in an embodiment of the present invention.

FIG. 9 is a cross-sectional view of one embodiment of the present invention, wherein hole fluid channels are square-shaped.

FIG. 10 is a cross-sectional view of one embodiment of the present invention, wherein a control assembly and a ball fluid bore are squared shaped.

DETAILED DESCRIPTION OF THE INVENTION

FIG. 1-8 describe an embodiment of the present invention, which includes a ball valve body, a ball 1 and a stem 2 fixed to the ball 1. Said ball valve body is provided with an inlet seat 3 and a outlet seat 4 located on a first side and a second side of the ball valve body respectively, whereas the inlet seat 3 is located on the first side and the outlet seat 4 is located on the second side of the ball valve body. An inlet fluid passage 5 is located in the ball valve body and the inlet seat 3, a outlet fluid passage 6 is located in the ball valve body and the outlet seat 4.

Said embodiment is characterized by: the ball 1 is placed in between the inlet seat 3 and the outlet seat 4; a control assembly is located on a first part of the ball 1 which is adjacent to the inlet seat 3; a plurality of hole fluid channels 7 are located on a second part of the ball 1 adjacent to the outlet seat 4, and connected to the control assembly. The ball fluid bore 8 is located on a front end of the control assembly of the ball 1, whereas said front end is adjacent to the inlet seat 3. Said control assembly consists of a plurality of layers of component discs 9, each of said component discs 9 is evenly provided with a plurality of multi-level angled turn fluid channels 10, which are connected with the hole fluid channel 7.

Preferably, said control assembly, the ball fluid bore 8 and the hole fluid channel 7 all have square-shaped cross-sections.

Said ball valve body includes a main body 11 and a auxiliary body 12. Sealing elements 13 are provided to connecting sections in between the main body 11, the auxiliary body 12, the inlet seat, the outlet seat 4 and/or the stem 2.

Yet another embodiment of the present invention provides a turned regulating ball valve, wherein the ball 1 is provide with the ball fluid bore 8 and the hole fluid channels 7, the control assembly is located and incorporated in the ball fluid bore 8; the inlet seat 3 is provided with the inlet fluid passage 5, which is connected to the ball fluid bore 8 in the ball 1; the outlet seat 4 is provided with the outlet fluid passage 6, which is connected to the hole fluid channels 7 in the ball 1; the control assembly is formed by multiplying the layers of the component discs 9, each of the component discs 9 is provided with the multi-level angled turn fluid channels 10; said multi-level angled turn fluid channels 10 has a inlet end which may be communicated to the ball fluid bore 8, and an outlet end which may be communicated to the hole fluid channels 7, respectively. For example, said multi-level angled turn fluid channels may be completely connected to, partially connected to, or completely disconnected to the ball fluid bore 8 and the hole fluid channels 7 by rotating the ball 1 at different degrees.

Figure 9:
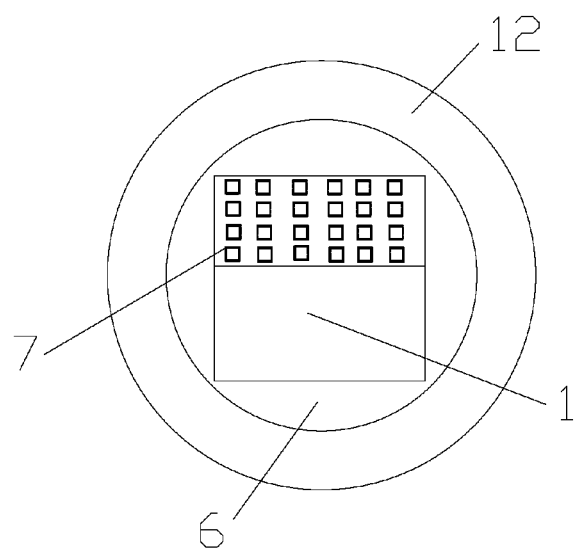
Figure 10:
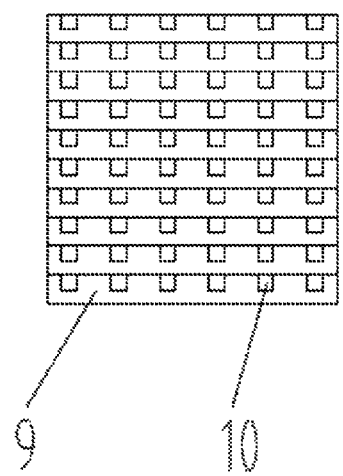

In one embodiment as shown in FIGS. 9&10, the cross-sections of the control assembly, the ball fluid bore 8, the inlet fluid passage 5, the outlet fluid passage 6 and the hole fluid channel 7 are square-shaped, which may allow accurate adjustments when rotating the stem 2. Said cross-sections may also form other shapes that allow the accurate adjustments.

Therefore, as a fluid medium pass through the multi-level angled turn fluid channels 10 which contains a plurality of turns along said channels, its energy is consumed when passing each turn of said channel, which results in decrease of its flow rate, its speed and its pressure, and lead to significant reduction of high speed due to the fluid medium under the high pressure differential.

In one embodiment, the ball 1 may rotate in the ball valve body using the stem 2 as the axis. During the rotation process, the ball fluid bore 8 in the ball 1 and the inlet fluid passage 5 in the inlet seat 3 form a first square-shaped flow passage area, which may lead to an increased inlet flow volume. The first square-shaped flow passage area is adjacent to an entrance of the ball, thus increases the flowing volume of the fluid medium at said entrance. The hole fluid channels 7 in the ball 1 and the outlet fluid passage 6 in the out seat 4 form a second square-shaped flow passage area.

It is to be understood that the use of "including", "comprising" or "having" and variations thereof herein is meant to encompass the items listed thereafter and equivalents thereof as well as additional items; the terms "a" and "an" herein do not denote a limitation of quantity, but rather denote the presence of at least one of the referenced item; and, the use of terms "first", "second", and the like, herein do not denote any order, quantity, or importance, but rather are used to distinguish one element from another.

It is to be understood that the above embodiments and examples are provided as illustrations only, and do not in any way restrict or define the scope of the present invention. Various other embodiments may also be within the scope of the claims.

I claim:
1. A turned regulating ball valve, comprising:
a ball valve body, a ball and a stem fixed to the ball,
said ball valve body has an inlet seat on a first side of the ball valve body and an outlet seat on a second side of the ball valve body;
an inlet fluid passage is provided in the ball valve body and the inlet seat, an outlet fluid passage is provided in the ball valve body and the outlet seat;
said ball is located between the inlet seat and the outlet seat; a control assembly is provided on a first part of the ball whereas said first part is adjacent to the inlet seat;
a plurality of hole fluid channels is provided to a second part of the ball whereas said second part is adjacent to the outlet seat, said hole fluid channels are connected to the control assembly;
a ball fluid bore which is provided to a front end of the control assembly, said control assembly comprises a plurality of layers of component discs, wherein a plurality of multi-level angled turn fluid channels is evenly provided to said component discs, said multi-level angled turn fluid channels are connected to the hole fluid channels; and,
the control assembly, the ball fluid bore and the hole fluid channel of said turned regulating ball valve all have square shaped cross sections.
2. A turned regulating ball valve, comprising:
a ball valve body, a ball and a stem fixed to the ball, said bail valve body has an inlet seat on a first side of the ball valve body and an outlet seat on a second side of the ball valve body;
an inlet fluid passage is provided in the ball valve body and the inlet seat, an outlet fluid passage is provided in the ball valve body and the outlet seat;
said ball is located between the inlet seat and the outlet seat;
a control assembly is provided on a first part of the ball whereas said first pan is adjacent to the inlet seat;
a plurality of hole fluid channels is provided to a second part of the ball whereas said second part is adjacent to the outlet seat, said hole fluid channels are connected to the control assembly;
a main body and an auxiliary body, wherein sealing elements are provided to connecting sections between the main body, the auxiliary body, the inlet seat, the outlet seat and/or the stem;
a ball fluid bore which is provided to a front end of the control assembly, said control assembly comprises a plurality of layers of component discs, wherein a plurality of multi-level angled turn fluid channels is evenly provided to said component discs, said multi-level angled turn fluid channels are connected to the hole fluid channels; and the control assembly, the ball fluid bore and the hole fluid channel of said turned regulating ball valve all have square shaped cross sections.

\* \* \* \* \*